United States Patent Office 3,069,411
Patented Dec. 18, 1962

3,069,411
MODIFICATION OF STARCH WITH PHOSPHATES AND AMIDES
Erling T. Hjermstad, Cedar Rapids, Iowa, assignor to Penick & Ford, Ltd. Incorporated, Cedar Rapids, Iowa, a corporation of Delaware
No Drawing. Filed Apr. 14, 1960, Ser. No. 22,111
9 Claims. (Cl. 260—233.5)

This invention relates to the preparation of nitrogen substituted phosphate derivatives of starch wherein the properties of the starch have been altered primarily by the introduction of phosphate groups containing nitrogenous radicals contrasted with the simple alkali metal monostarch phosphate esters. The introduction into starch of phosphate groups having a sufficient proportion of combined nitrogen has been discovered to have beneficial effects of considerably greater potency than similar proportions of alkali metal phosphate ester groups. The new starch derivatives are produced in the native, white, ungelatinized, undegraded granule form and are characterized by high purity, greatly lowered gelatinization temperatures, increased rate of swelling, gelatinization and granule dispersion on heating, excellent color, greatly increased paste viscosity, increased paste clarity, and the ability of their pastes to remain translucent and fluid on cooling and aging.

This application is a continuation-in-part of my copending application Serial No. 735,135, filed May 14, 1958, and now abandoned.

Alkali metal mono- and distarch phosphate esters of starch have also been produced in the past by treating starch with alkali metal orthophosphates, metaphosphates, pyrophosphates, polymetaphosphates, and polyphosphates. It is known that the anhydride forms of phosphoric acid, such as the metaphosphates, polyphosphates, and pyrophosphates will undergo a cross-linking reaction when heated with starch under relatively alkaline conditions. It is also known that when starch is strongly heated under approximately neutral conditions with alkali metal orthophosphates or alkali metal salts of the anhydride forms of phosphoric acid it is possible to obtain a low efficiency reaction which produces a partial alkali metal mono starch phosphate ester. These products have the usual characteristics of monofunctionally substituted starch, such as lowered swelling temperature, and reduced gelling tendency. However, alkali metal orthophosphates react with starch with extreme difficulty and only by heating the starch at relatively high temperatures is any appreciable proportion of phosphorus bound. Unfortunately, starch undergoes degradation and browning reactions within the temperature range which is of practical value in conducting reactions with alkali metal orthophosphates, even under neutral conditions. Another disadvantage is the necessity of having a large excess of alkali metal phosphate in contact with the starch during the reaction period in order to obtain a significant degree of reaction. The use of excess alkali metal phosphate is not only costly and wasteful but unduly contaminates the product and results in films of low strength. Removal of excess alkali metal phosphate from such products is difficult and with the higher substituted alkali metal starch phosphates is commercially unfeasible because of their tendency to swell when washed with water. For these reasons, the mono starch alkali metal phosphate esters have heretofore been in the form of dark colored powders having a high proportion of unreacted inorganic phosphate and when gelatinized they produce tan or brown colored pastes.

Phosphorus derivatives of starch have been produced in the past by treatment with reagents such as phosphorus oxychloride, thiophosphoryl chloride, phosphorus pentachloride, etc. These reagents have been reacted with starch for the purpose of securing a "cross-linking" esterification which results in products having "toughened" granules with varying degrees of increased resistance to gelatinization, depending on the proportions of these reagents which are combined. The treatment of starch with low proportions of these reagents, for example, 0.005 to 0.5 part of phosphorus oxychloride to 100 parts of starch, results in increased resistance to starch granule gelatinization on heating in water and increased resistance to granule dispersion and resultant viscosity decrease on continued heating at elevated temperatures. The higher paste viscosities which are obtained with such products are due to their resistance to granule disintegration rather than to the introduction of hydrophilic groups. Treatment of starch with higher proportions of phosphorus oxychloride results in products which are extremely resistant to swelling even at the boiling temperature of water. In general, such products are characterized by higher swelling temperatures, resistance to granule dispersion on heating in water, paste opacity, and non-cohesive or "short" textured pastes. These effects are believed to be due to the formation of diphosphoric acid ester groups which cross-link the starch molecular chains and decrease the hydrophilic nature of the starch.

An object of this invention is to provide an efficient and economical process for the production of a new class of monofunctionally substituted starch ester derivatives containing nitrogen-substituted phosphate ester groups. Another object is to produce starch phosphate ester derivatives having negligible color and very low unreacted inorganic phosphate content. A further object is to produce mono starch ester derivatives containing nitrogen-substituted phosphate ester groups which are characterized by having greatly lowered gelatinization temperature, increased hydration capacity, greatly increased paste viscosity, increased rate of granule disintegration on cooking, increased paste clarity and cohesiveness, and substantial elimination of gelling and clouding of cooked pastes on aging while having phosphorus contents substantially lower than has been heretofore considered essential for developing these characteristics to a practical or useful degree. Still another object is to provide a process for preparing starch ester derivatives containing nitrogen-substituted phosphate ester groups in the original unswollen granule form which swell to substantially colorless paste in cold water. Other objects and advantages will appear below.

The invention is based in part on the discovery that certain critical molecular ratios of water-soluble inorganic phosphates and water soluble organic amides will co-react with ungelatinized starch at a relatively rapid rate and at substantially lower temperatures than do alkali metal phosphate salts alone. The products are believed to be monofunctionally substituted starch ester derivatives containing nitrogen substituted phosphate groups. In addition, it has been discovered that such nitrogen substituted phosphate ester groups have considerably greater beneficial effects on the paste and film properties of starch than do ordinary alkali metal phosphate groups. The reaction will proceed at temperatures sufficiently low and with a pH range sufficiently close to neutrality to preclude any appreciable darkening or depolymerization of the starch. The new products are therefore obtained as white powders which gelatinize to form substantially colorless translucent pastes. Due to the low proportions of reagents which are required to secure a beneficial effect the products prepared according to this invention have a very low inorganic salt content. This is a decided advantage in view of the difficulty and cost of purifying mono starch phosphate ester derivatives due to their tendency to swell when washed with water. By reacting starch with certain critical molecular proportions of water soluble phosphate salts and water soluble organic amides, new types of mono starch phosphate ester derivatives are produced which are characterized by greatly lowered gelatinization temperatures, increased hydration capacity, increased rate of granule disintegration on cooking, increased paste clarity and cohesiveness, greatly increased paste viscosity, greatly reduced tendency of pastes to form gels and become cloudy on cooling and aging, and increased film flexibility and clarity.

The process which has been developed for producing such monofunctionally substituted starch phosphate ester derivatives is particularly convenient and economical. It is necessary only to bring phosphate salts and amides into intimate contact with the starch granules and then heat the mixture at temperatures ranging from approximately 200°–280° F. Speaking more generally, the temperature should be high enough to promote the esterification reaction but below a temperature causing appreciable browning and/or depolymerization of the starch. Under these conditions, a monofunctional esterification apparently occurs between the alcoholic hydroxyl groups of the starch and the phosphate-amide complex which results in a mono-starch ester derivative containing nitrogen substituted phosphate ester groups.

The use of extremely small proportions of phosphate salts and amides results in considerable change in the paste and gel characteristics of the starch. The new products are characterized by greatly reduced swelling and gelatinization temperature range, increased rate of hydration and development of paste viscosity on heating in water, greatly increased paste viscosity, increased paste translucency, and negligible tendency of the pastes to retrograde to the insoluble state or form gels on cooling and aging.

The amide and phosphate salt should be brought into intimate contact with the starch granules in order to secure homogeneously reacted products. This can be accomplished by first steeping commercial unswollen, filterable starch in a water solution of a soluble phosphate salt and an amide or mixtures of different phosphates and amides, dewatering the starch in a filter, then drying the filter cake. The starch is preferably ground to the powdered form before heating to the reaction temperature. The starch containing steeped in phosphates and amides is heated with agitation for definite periods of time at temperatures ranging from 200–280° F. while allowing moisture to escape. The use of a vacuum, though not essential, aids in the removal of moisture and helps provide the necessary desiccation to promote the esterification reaction.

In general, the heating should be continued until the starch contains in molecular combination therewith at least 0.1% phosphorus together with at least 0.2% nitrogen, or at least until the major portions of the phosphate salt and the amide have reacted with the starch. However, the heating must be terminated before any appreciable discoloration (browning) of the starch occurs.

The starches which respond to the above described treatment include all of the common commercial varieties of starch which exist in the native, white, ungelatinized, undegraded granule form.

The phosphate salts which are suitable are the water-soluble salts of orthophosphoric acid, metaphosphoric acid, and polyphosphoric acid, and pyrophosphoric acid, as well as water-soluble salts of alkyl substituted phosphoric acids which are capable of undergoing an esterification reaction with starch. The alkali metal (particularly sodium and potassium) and ammonium salts of the above listed phosphoric acids are especially suitable in the process. The phosphate salt should contain at least one hydroxyl group. The proportion of phosphate salt may vary, since the degree of change produced in the paste and gel properties of the product is proportional to the amounts of reagents used. Low proportions, for example, .005 mole of phosphate salt per $C_6H_{10}O_5$ mole of starch, results in only a slight lowering of gelatization temperature, a slight increase in paste viscosity, and a slight reduction in gelling tendencies. As the proportion of phosphate salt and amides is increased, progressively lower swelling temperatures, higher paste viscosities, and reduced gelling tendencies are obtained, to the extent that the starch becomes capable of instantly gelatinizing in cold water to form extremely viscous pastes which are extremely stable on aging. Such cold-water swelling products can be obtained by using proportions as low as 0.1 mole of phosphate salt and 0.2 mole of amide per $C_6H_{10}O_5$ mole of starch. As a minimum at least 0.01 mole of phosphate salt should be used per $C_6H_{10}O_5$ mole of starch to obtain a substantial modification of the properties of the starch. The amount of amide employed should be sufficient to produce a product containing 0.2% nitrogen.

The amides which are suitable are characterized by containing the $$\overset{O}{\underset{}{\overset{\|}{-C}}}-NH_2$$

group. These include the monoamides derived from saturated monocarboxylic acids such as formamide, butyramides, valeramides and caproamides; unsaturated monoamides such as acrylamide; and diamides such as carbamide (urea), malonamide, and phthalamide. Water-soluble substituted amides or carbamides are also operable, such as 1, 3-dimethyl urea, allylurea, acetyl urea, etc. While all water-soluble amides are believed to be operative, the best results are obtained with carbamide, formamide, acrylamide, and other simple amides containing from 1 to 2 carbon atoms. The proportions of amides used to starch may vary depending on the degree of change in the paste and gel properties of the starch which is desired. However, the proportion of amide required in the process of this invention is dependent on the proportion of phosphate salt which is combined. When phosphate salts and carbamide are heated together in a concentrated solution in water to above 215° F. a copious evolution of ammonia occurs indicating an interaction between the two compounds. This evolution of ammonia also occurs at approximately the same temperature when starch containing a soluble phosphate salt and carbamide is heated. It therefore appears evident that an intermediate reaction product is formed which is considerably more reactive with starch than alkali metal phosphates alone. While the above observation indicates that molar equivalent proportions of carbamide and phosphate salts can be used in the present process it has been found that even better results can be achieved when greater than one mole of amide per mole of phosphate salt is employed. As the ratio of carbamide to phosphate is increased above molar equivalence the reaction with starch proceeds more readily and at lower temperatures and the nitrogen content of thoroughly washed products increases. With a given proportion of a phosphate salt increasing the proportion of amide (e.g. carbamide) over the range of 1.0–5.0 mole of amide per mole of phosphate salt results in increasing amount of lowering of starch gelatinization temperature, increasing paste viscosity, and decreasing tendency of pastes to gel and retrograde on aging. Higher proportions of amide (up to 10 moles of amide per mole of phosphate salt) can be used in many cases without interfering with the desired reaction, but this may lead to an unnecessary wastage of the amide reactant. For some purposes the proportions of phosphate salts and amides can range from 0.01 to 0.15 mole of phosphate salt per $C_6H_{10}O_5$ mole of starch in combination with from 1.0 to 10.0 moles of amide per mole of phosphate salt. Where non-gelling translucent products are desired .01–.05 mole of phosphate salt per mole of starch can be used; while for cold water swelling products, the proportion of phosphate salt can range from .06 to .135 mole per mole of starch. In general, sufficient proportions of the phosphate salt and the amide should be used so that the properties of the final product are significantly modified.

The temperature range in which the reaction takes place is very wide, though the rate of reaction increases with increasing temperatures. Temperatures at least as high as 200° F. are preferred for obtaining significant changes in starch properties within a reasonable period of time. Temperatures up to 280° F. may be used, though short heating periods should be used at this temperature in order to avoid browning and depolymerization of the starch. The reaction proceeds at a higher rate at higher temperatures, but the browning and depolymerization become progressively more pronounced as the reaction temperature is raised. In general, reaction temperatures ranging from 200° F. to 280° F. give the best results in the process.

In order to obtain products with negligible depolymerization and browning, it is desirable that the starch reaction mixture have a pH value as closed to neutrality as possible, viz., pH 6.5–7.5. This may be readily accomplished by adjusting the pH of the suspension when starch is steeped in the phosphate-amide solution prior to heating and reacting. Monobasic phosphates or mixtures of monobasic and dibasic phosphates are especially suitable for preparing products at a pH close to 7.0. If special precautions are taken, other pH's could be used, within the range from pH 5.0 to 7.5. The optimum pH range for the least amount of browning and depolymerization is from pH 6.5–7.5. In preparation of products which are moderately depolymerized, while still being substantially colorless, pH values from 6.5 down to 5.0 are suitable.

The new products are suitable in many industrial applications. Their lowered gelatinization temperatures, increased rate of granule disintegration on cooking, negligible gelling and retrogradation tendencies with resultant minimum of hard size formation, and smooth, more flexible films, make them useful in warp sizing and finishing of textiles. Their non-gelling, salve-like pastes when cooked in higher concentrations make them suitable for use in adhesive formulations which require high spreadability, low set-back, and high adhesive strength. These derivatives can be prepared in such a way that they swell at relatively low temperatures even though a relatively small proportion of reagents is used. This property makes them useful as low cost beater sizes for paper, as well as other applications which require low temperature gelatinization. Their film flexibility, clarity, and smoothness is of value in the surface sizing of paper. Derivatives having a wide range of gelatinization temperatures can be prepared by the new process. They are, therefore, ideal for use in various types of laundry starches, either those which require some cooking or those which are completely cold-water soluble. The extremely high paste viscosities which can be obtained with these derivatives make them useful as thickeners and suspending agents in various industrial applications.

The process by which the new derivatives are prepared is relatively simple and convenient. The products are uniformly reacted and by selecting the proper conditions of temperature, pH and time, perfectly white starch derivatives are obtained in the native, ungelatinized granule form. These, when cooked in water, produce colorless pastes which dry to relatively clear, colorless films. The products having lower degrees of substitution may be suspended in water, dewatered on a filter and purified by washing the filter cake. Such products produce exceptionally viscous, very translucent, non-gelling pastes, even in concentrations as low as 1%. For many uses it is not necessary to purify the product after reaction.

The reaction of starch with phosphate salts and amides results in products containing molecularly combined phosphorus and nitrogen which is not removed by washing with water. Treatment of a series of starches with a constant proportion of $NaH_2PO_4$ and increasing proportions of $CO(NH_2)_2$ resulted in products which, after washing thoroughly, showed fairly constant phosphorus content and increasing nitrogen content. The paste viscosity of these products increased with increasing nitrogen content while the swelling temperatures were lowered. These properties are characteristic of monofunctionally substituted starches, for example, sodium carboxymethyl starch, acetyl-esters of starch, methyl ethers of starch, etc. Starches which are bifunctionally substituted such as the distarch phosphates produced by treatment with phosphorus oxychloride, metaphosphates, polymetaphosphates, etc., show raised swelling temperatures and resistance to gelatinization and development of viscosity, especially with increasing substitution.

The reaction products of phosphate salts and amides shows none of the properties of the so-called cross-linked starches. They are evidently simple esterification products containing nitrogen substituted phosphate ester groups. The nature of the nitrogen groups is not known with certainty. One the contrary, varying ratios of nitrogen to phosphorus can be combined by selecting the method of treatment. This indicates that the nitrogen may be present in one or more of several different groups, though in general, variations in nitrogen groups result in similar properties of the new products. In general, with a given phosphorus content, increasing nitrogen content results in increasing paste viscosity, increasing paste translucency, decreased gelling and retrogradation tendency, and progressive lowering of starch swelling temperature.

Due to the extraordinary influence of the nitrogenous groups on the properties of the products, the new derivatives need have only a very low phosphorus content. Analysis of thoroughly washed and purified reaction products had indicated that phosphorus contents of 0.1 to 0.2% and nitrogen contents of 0.2 to 0.4% are sufficient to give corn starch the characteristics of greatly lowered swelling temperature, increased paste viscosity, and the ability to form colorless, stable, translucent pastes which do not retrograde or form gels on aging. As the phosphorus and nitrogen contents are increased above these values the products become increasingly cold water swelling. Since purification of these cold water swelling products is not commercially feasible to proportion of phosphate which is used in their production determines the inorganic salt content. The present process affords a means of securing cold-water-swelling starch phosphate derivatives using relatively low proportions of phosphates as compared with the proportions used in the past. For example, by the use of 5% by weight or less of monosodium phosphate and 10–15% by weight of carbamide based on dry starch colorless, cold-water-gelatinizing products can be prepared by the process of the present invention. Previous processes by which cold water swelling alkali metal phosphate esters of starch have been produced generally require from 15 to 40% by weight of phosphate salts based on dry starch.

Another distinct advantage of the process of this invention is the negligible degradation and development of color of the product during reaction. In order to secure an efficient reaction of alkali metal phosphates with starch it is necessary to use reaction temperatures above 280° F. up to 340° F. This results in brown-colored, degraded products which have poor sales appeal and are deleterious in some applications, such as paper sizing and coating. Such high temperatures are not required in the process of the present invention. Efficient reactions of starch with phosphate salts and molecular porportions of amides equal to or greater than the proportion of phosphate can be conducted at tempertaures ranging from 220–280° F., thus avoiding browning and heat depolymerization of the starch.

The method and products of this invention are further illustrated by the following specific examples:

EXAMPLE 1

Unmodified corn starch was suspended in a 45% solids concentration in water solutions of various soluble amides and a proportion of monosodium and disodium phosphate giving a suspension pH of 6.8–7.2. The suspensions were dewatered to a solid filter cake, dried, and ground to the powdered form. The dry starches were heated and agitated in an open vessel for 4 to 5 hours at temperatures ranging from 270 to 280° F. The products were obtained as white powders consisting of esterified starch in the native, unswollen granule form.

The starch esters were compared with controls consisting of portions of identical starch-phosphate-amide mixtures which were not heated and reacted. The starch esters and controls were tested by cooking in a Corn Industries Viscometer (J. Ind. and Eng. Chem., Anal. Ed. vol. 19, p. 16, 1947) in 5.4% dry substance concentrations in water for 20 minutes, using a 198° F. water bath and a propeller speed of 60 r.p.m. Data on the temperature of initial rise viscosity, peak viscosity, and viscosity after 20 minutes in the viscometer, were obtained. The pastes were then aged for 24 hours at 68° F. and their gel strength values were obtained by means of a Corn Industries Gelometer (Cereal Chem., vol. XXXII, No. 3; p. 200–207, 1955). The general characteristics of the aged pastes were noted and described. The comparison of the new starch esters and their controls is shown in Table A.

Table A

Comparison of Reaction Products of Unmodified Corn Starch, 0.027 mole of sodium ortho phosphate per $C_6H_{10}O_5$ mole of starch, and various amides with their controls.

| Amide | Mole of amide per $C_6H_{10}O_5$ mole of starch | Reacted or control | C. I. viscometer (5.4% concentration 198° F. bath) | | | Gel strength, gms. |
|---|---|---|---|---|---|---|
| | | | Temp. initial viscosity, ° F. | Peak viscosity, gm. cm. | 20 min. viscosity, gm. cm. | |
| Formamide | 0.19 | Reacted | 145 | 440 | 248 | 7 |
| | | Control | 188 | 150 | 150 | 11 |
| Acetamide | 0.14 | Reacted | 155 | 207 | 80 | 11 |
| | | Control | 189 | 138 | 138 | 20 |
| Propionamide | 0.13 | Reacted | 160 | 240 | 80 | 22 |
| | | Control | 175 | 136 | 70 | 73 |
| Isobutyramide | 0.13 | Reacted | 160 | 268 | 180 | 28 |
| | | Control | 175 | 135 | 112 | 57 |
| n-Caproamide | 0.13 | Reacted | 161 | 220 | 160 | 36 |
| | | Control | 177 | 130 | 110 | 51 |
| Acrylamide | 0.11 | Reacted | 150 | 508 | 260 | 2 |
| | | Control | 189 | 180 | 180 | 20 |
| Carbamide | 0.14 | Reacted | 142 | 1,064 | 664 | 20 |
| | | Control | 183 | 150 | 150 | 84 |
| Malonamide | 0.13 | Reacted | 170 | 286 | 166 | 39 |
| | | Control | 178 | 125 | 110 | 83 |
| Dimethylurea | 0.09 | Reacted | 145 | 332 | 125 | 4 |
| | | Control | 181 | 93 | 93 | 35 |

When the cooled, aged pastes of the reaction products and their controls were compared, it was found that the former produced pastes which were translucent and substantially non-gelling while the pastes of the controls formed opaque gels.

EXAMPLE 2

Unmodified corn starch was brought into intimate contact with carbamide (urea) and various water-soluble phosphate salts by the method described in Example 1. The starch was heated with agitation at different temperatures for varying periods of time. The reaction products were then cooled, suspended in water, dewatered in a suction filter, and the filter cake washed repeatedly with distilled water. The products were then dried to normal commercial moisture content. The products consisted of esterified starch in the native granule form. The proportions of reagents used and reaction conditions are shown in Table B. The characteristics of the washed, purified products are shown in Table C.

Table B

| Run No. | Phosphate salt | Mole of phosphate per $C_6H_{10}O_5$ mole of starch | Mole of carbamide per $C_6H_{10}O_5$ mole of starch | Temp. heated, ° F. | Time heated, hrs. |
|---|---|---|---|---|---|
| 1 | Monosodium phosphate | .005 | .030 | 270–280 | 4–5 |
| 2 | ...do... | .008 | .049 | 270–280 | 4–5 |
| 3 | ...do... | .010 | .065 | 270–280 | 4–5 |
| 4 | ...do... | .013 | .110 | 270–280 | ·4–5 |
| 5 | ...do... | .040 | .270 | 270–280 | 1/2–1 |
| 6 | Diammonium phosphate. | .061 | .270 | 270–280 | 1/2–1 |
| 7 | Dipotassium phosphate. | .066 | .270 | 270–280 | 1/2–1 |
| 8 | Tetra sodium pyrophosphate. | .024 | .130 | 270–280 | 1/2–1 |
| 9 | Sodium acid pyrophosphate. | .036 | .130 | 270–280 | 1/2–1 |
| 10 | Disodium glycero phosphate. | .015 | .130 | 270–280 | 4–5 |
| 11 | Sodium hexametaphosphate. | .032 | .162 | 270–280 | 4–5 |
| 12 | Sodium tripolyphosphate. | .010 | .162 | 270–290 | 4–5 |

Table C

C.I.V. (5.4% CONC. 198° F. BATH)

| Run No. | Temp. initial viscosity, ° F. | Peak viscosity, gm. cm. | 20 min. viscosity, gm. cm. | Gel strength, grams | Characteristics of cooled, aged pastes |
|---|---|---|---|---|---|
| 1 | 160 | 390 | 350 | 37 | Soft gel, cloudy. |
| 2 | 152 | 560 | 440 | 21 | Slight gel, translucent. |
| 3 | 148 | 620 | 468 | 17 | Nongelling, translucent. |
| 4 | 142 | 840 | 580 | 28 | Nongelling, very translucent. |
| 5 | 132 | 1640 | 720 | 30 | Do. |
| 6 | 140 | 800 | 400 | 14 | Do. |
| 7 | 151 | 776 | 340 | 22 | Do. |
| 8 | 144 | 960 | 536 | 31 | Do. |
| 9 | 142 | 1096 | 560 | 31 | Do. |
| 10 | 144 | 300 | 264 | 4 | Do. |
| 11 | 142 | 420 | 332 | 8 | Nongelling, translucent. |
| 12 | 112 | 1360 | 560 | 25 | Very translucent, nongelling. |
| Unmod. corn starch. | 180 | 240 | 210 | 73 | White, opaque gel. |

The data in Table C illustrate the effect of very small proportions of phosphate salts and carbamide in producing substantial lowering of swelling temperature, very great increases in paste viscosity, and reduction of gelling and paste opacity. All of the pastes were substantially colorless. The cooled pastes had a salve-like consistency and clarity similar to that obtained with waxy maize starch. Unmodified corn starch when cooked in water swells at temperatures substantially higher and produces pastes with considerably lower viscosity and on cooling forms a rigid, opaque gel.

EXAMPLE 3

Various kinds of starch were brought into intimate contact with carbamide and monosodium phosphate by the method described in Example 1. The starches were heated at 270–280° F. for 2–3 hours with agitation in an open vessel. The products were obtained as powders in the native, ungelatinized granule form. The starch esters were compared with controls consisting of the identical starch-phosphate-amide mixtures which were not heated and reacted. The proportions of reagents and reaction conditions are shown in Table D. The comparison of reaction products with their controls is shown in Table E.

Table D

| Run No. | Starch | Mole of NaH$_2$PO$_4$/ C$_6$H$_{10}$O$_5$ mole of starch | Mole of CO(NH$_2$)$_2$/ C$_6$H$_{10}$O$_5$ mole of starch | Temp. reacted, °F. | Time reacted, hours |
|---|---|---|---|---|---|
| 1 | Unmodified wheat | .050 | .16 | 270-280 | 2-3 |
| 2 | Unmodified rice | .027 | .08 | 270-280 | 2-3 |
| 3 | Unmodified tapioca | .027 | .08 | 270-280 | 2-3 |
| 4 | Unmodified waxy maize | .027 | .08 | 270-280 | 2-3 |
| 5 | Unmodified potato | .040 | .13 | 270-280 | ½-1 |
| 6 | Corn (40 fluidity) | .040 | .13 | 270-280 | ½-1 |
| 7 | Hydroxyethyl corn (3% substituted) | .027 | .08 | 270-280 | 2-3 |

Table E
Comparison of Reaction Products of Table D with their Controls, C.I. Viscometer—198° F. bath.

| Run No. | Conc. | Temp. initial viscosity, °F. | Peak viscosity, gm. cm. | 20 min. viscosity, gm. cm. |
|---|---|---|---|---|
| 1 | 7.0 | 119 | 152 | 52 |
| Control | 7.0 | | 0 | 0 |
| 2 | 7.0 | 145 | 332 | 95 |
| Control | 9.0 | 176 | Slow rise | 248 |
| 3 | 5.0 | 122 | 446 | 137 |
| Control | 7.0 | 151 | 240 | 95 |
| 4 | 6.0 | 122 | 744 | 370 |
| Control | 6.0 | 162 | 45 | 25 |
| 5 | 6.0 | 126 | 1,512 | 968 |
| 6 | 11.0 | 138 | 1,176 | 20 |
| 7 | 6.0 | 104 | 1,800 | 765 |

The data in Table E show that phosphate and carbamide react with other varieties of starch and with modified corn starches to produce substantially lowered swelling temperatures, and increased paste viscosities. Most of these starches were substantially non-gelling in the untreated state. Higher gel strength values were obtained with some of the treated starches. This indicates higher cold paste viscosity. This effect is shown in Example 2 where the washed, purified reaction products of corn starch, monosodium phosphate and carbamide showed first a reduction in gel strength values and then an increase as very high paste viscosities were obtained.

EXAMPLE 4

Unmodified corn starch was brought into intimate contact with higher proportions of monosodium phosphate and carbamide by the method described in Example 1. The starch-amide-phosphate mixtures were heated with agitation at different temperatures and pressures for varying periods of time. The products were obtained as white powders in the native, ungelatinized granule form. The products were cooled and tested by suspending in room temperature water at 70–75° F. The swelling characteristics were noted. The reaction conditions and product characteristics are shown in Table F.

Table F

| NaH$_2$PO$_4$ mole per C$_6$H$_{10}$O$_5$ mole of starch | Co(NH$_2$)$_2$ mole per C$_6$H$_{10}$O$_5$ mole of starch | Temp. heated, °F. | Time heated, hours | Pressure | Swelling characteristics of products in water at 70°-75° F. at pH 6.5-7.0 |
|---|---|---|---|---|---|
| 0.04 | 0.11 | 270-280 | 4-5 | Atm | Slow swell to cloudy viscous paste. |
| 0.10 | 0.20 | 70-280 | 3 | 23" vac | Swells fast to cloudy viscous paste. |
| 0.10 | 0.20 | 260-270 | 3-4 | Atm | Slow swell to cloudy paste. |
| 0.10 | 0.20 | 260-270 | 5-6 | Atm | Fast swell to cloudy paste. |
| 0.10 | 0.20 | 260-270 | 21-22 | Atm | Instant swell to translucent paste. |
| .07 | 0.40 | 270-280 | 23-24 | Stm | Do. |
| .135 | 0.27 | 70-280 | 3 | 23" vac | Do. |
| None | 0.40 | 70-280 | 3 | 23" vac | No swelling. |

The data in Table F show the effect of relatively low proportons of reagents in producing instantly cold water gelatinizable starches in the native, ungelatinized granule form. All of the reacted products described in Table F gelatinized to form colorless pastes having viscosities considerably higher than that of unmodified corn starch. While it is known that carbamide has a tendency to lower the gelatinization temperature of starch suspensions, a control run with carbamide and unmodified starch did not produce a cold-water swelling product, though the product gelatinized in hot water at a somewhat lower temperature than unmodified corn starch.

EXAMPLE 5

Unmodified corn starch was brought into intimate contact with monosodium phosphate and carbamide by the method described in Example 1. The dry starch-amide-phosphate mixtures were heated for different periods of time at widely varying temperatures with agitation in an open vessel. The products were obtained as white powders in the native, ungelatinized granule form. The reaction products were compared with a control consisting of an identical starch-phosphate-amide mixture which was not heated and reacted. The initial starch mixtures contained from 0.02 to 0.027 mole of NaH$_2$PO$_4$ per C$_6$H$_{10}$O$_5$ mole of starch and from 0.12 to 0.16 mole of carbamide per C$_6$H$_{10}$O$_5$ mole of starch. The reaction conditions and product are shown in Table G.

Table G
C.I.V.—5.4% CONC. 198° F. BATH

| Temp. reacted, °F. | Time reacted, hours | Temp. initial viscosity, °F. | Peak viscosity, gm. cm. | 20 min. viscosity gm. cm. | Gel strength, gram | Character of aged pastes |
|---|---|---|---|---|---|---|
| None | None | 183 | 150 | 150 | 103 | Opaque firm gel. |
| 200 | 23-24 | 165 | 300 | 240 | 50 | Translucent, sl. gel colorless. |
| 220 | 24-25 | 151 | 468 | 320 | 53 | Translucent, non-gelling colorless. |
| 240 | 17-18 | 150 | 768 | 380 | 34 | Do. |
| 270-280 | 4-5 | 142 | 1,064 | 664 | 35 | Translucent, sl. yellow. |
| 290-300 | 1-2 | 140 | 400 | 192 | 7 | Translucent, yellow color. |

The data in Table G show that the starch-amide-phosphate reaction can be obtained over a wide range of temperatures without significant depolymerization or browning of the product. In general, higher reaction temperatures result in faster rates of reaction. The reaction proceeds rapidly at temperatures above 300° F. but the starch is increasingly depolymerized and browned with increasing temperatures about 300° F.

While in the foregoing specification the novel method and products of this invention have been described in considerable detail and a number of specific embodiments have been referred to for purpose of illustration, it will be apparent to those skilled in the art that the invention is susceptible to additional embodiments and that many of the details described herein can be varied considerably without departing from the basic principles of the invention.

I claim:

1. The method of modifying starches with phosphates and amides characterized by the production of nitrogen and phosphorus containing starch derivatives in the native, white, ungelatinized, granule form, comprising forming an intimate mixture of starch with a water-soluble inorganic phosphate salt containing at least 1 hydroxyl group and with a water-soluble organic amide containing a

group, said mixture being formed in the presence of sufficient water under approximately neutral pH conditions to dissolve said phosphate salt and said amide, from 1 to 10 moles of said amide being present per each mole of said phosphate salt and from 0.01 to 0.15 mole of said phosphate salt being present per $C_6H_{10}O_5$ mole of said starch, said starch being in the native, white, ungelatinized, granule form, and heating said mixture as a continuous solid phase at a temperature within the range from 220 to 280° F., said heating being continued in the presence of unreacted portions of said phosphate salt and said amide until said starch contains in molecular combination therewith at least 0.1% phosphorus together with at least 0.2% nitrogen, said heating being terminated however before any appreciable discoloration of said starch occurs.

2. The method of claim 1 in which said amide is formamide.

3. The method of claim 1 in which said amide is acrylamide.

4. The method of claim 1 in which said amide is carbamide.

5. The method of modifying starches with phosphates and amides characterized by the production of nitrogen and phosphorus containing starch derivatives in the native, white, ungelatinized, undegraded granule form, comprising steeping native, white, ungelatinized, undegraded granule starch in an aqueous solution of a water-soluble inorganic phosphate salt containing at least 1 hydroxyl group capable of undergoing an esterification reaction with starch and a water-soluble organic amide containing a

group at a substantially neutral pH within the range from 5.0 to 7.5, said solution containing from 0.01 to 0.15 mole of said phosphate salt per $C_6H_{10}O_5$ mole of said starch and from 1.0 to 10.0 moles of said amide per each mole of said phosphate salt, dewatering the starch to obtain an intimate mixture of said starch, said phosphate salt, and said amide, said dewatered mixture containing from 0.01 to 0.15 mole of said phosphate salt per $C_6H_{10}O_5$ mole of said starch and from 1.0 to 10.0 moles of said amide per each mole of said phosphate salt, and heating said dewatered mixture at a temperature within the range from 220 to 280° F., said heating being continued in the presence of unreacted portions of said phosphate salt and said amide until said starch contains in molecular combination therewith at least 0.1% phosphorus together with at least 0.2% nitrogen, said heating being terminated however before any appreciable discoloration of said starch occurs.

6. The method of claim 5 in which said amide is carbamide.

7. The method of claim 5 in which said amide is formamide.

8. The method of claim 5 in which said amide is acrylamide.

9. The method of modifying starches with phosphates and amides characterized by the production of nitrogen and phosphorus containing starch derivatives in the native, white, ungelatinized, undegraded granule form, comprising steeping native, white, ungelatinized, undegraded granule starch in an aqueous solution of a water-soluble inorganic phosphate salt and a water-soluble organic amide at a pH of about 6.5 to 7.5, said phosphate salt containing at least one hydroxyl group and being selected from the group consisting of sodium, potassium, and ammonium salts of orth-, meta-, and pyro-phosphoric acids, said amide containing a

group and from 1 to 3 carbon atoms, said solution containing from 0.01 to 0.10 mole of said phosphate salt per $C_6H_{10}O_5$ mole of said starch and from 7 to 5 moles of said amide per mole of said phosphate salt, dewatering the starch by filtration to obtain an intimate mixture of said starch, said phosphate salt, and said amide, said dewatered mixture containing from 0.01 to 0.10 mole of said phosphate salt per $C_6H_{10}O_5$ mole of said starch and from 1 to 5 moles of said amide per each mole of said phosphate salt, the starch and said dewatered mixture being in the native, white, ungelatinized, undegraded granule form, and heating said dewatered mixture as a continuous solid phase at a temperature within the range from 220 to 280° F., said heating being continued until the major portions of said phosphate salt and said amide have reacted with said starch, but said heating being terminated before any appreciable discoloration of said starch occurs.

References Cited in the file of this patent

UNITED STATES PATENTS

| | | |
|---|---|---|
| 2,801,249 | Kerr et al. | July 30, 1957 |
| 2,824,870 | Neukom | Feb. 25, 1958 |
| 2,857,377 | Martin et al. | Oct. 21, 1958 |

UNITED STATES PATENT OFFICE
CERTIFICATE OF CORRECTION

Patent No. 3,069,411　　　　　　　　　　　　　　December 18, 1962

Erling T. Hjermstad

It is hereby certified that error appears in the above numbered patent requiring correction and that the said Letters Patent should read as corrected below.

Column 12, line 41, for "7 to 5 moles" read -- 1 to 5 moles --.

Signed and sealed this 18th day of June 1963.

(SEAL)
Attest:

ERNEST W. SWIDER
Attesting Officer

DAVID L. LADD
Commissioner of Patents